(12) United States Patent
Brennan et al.

(10) Patent No.: US 10,627,417 B2
(45) Date of Patent: Apr. 21, 2020

(54) REAGENT CONTAINER ANTI-EVAPORATION TUBE (71) Applicant: Siemens Healthcare Diagnostics Inc., Tarrytown, NY (US)

(72) Inventors: Joseph Brennan, Newark, DE (US); James Kegelman, Wilmington, DE (US); William Hudson, Bear, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 275 days.

(21) Appl. No.: 15/034,690

(22) PCT Filed: Oct. 30, 2014

(86) PCT No.: PCT/US2014/063248
§ 371 (c)(1),
(2) Date: May 5, 2016

(87) PCT Pub. No.: WO2015/069549
PCT Pub. Date: May 14, 2015

(65) Prior Publication Data
US 2016/0266156 A1 Sep. 15, 2016

Related U.S. Application Data (60) Provisional application No. 61/900,220, filed on Nov. 5, 2013.

(51) Int. Cl.
*G01N 35/00* (2006.01)
*G01N 35/04* (2006.01)
(Continued)

(52) U.S. Cl.
CPC ........ *G01N 35/00663* (2013.01); *B01L 3/523* (2013.01); *B01L 3/561* (2013.01);
(Continued)

(58) Field of Classification Search
CPC .............. B01L 3/523; B01L 2200/142; B01L 2200/025; B01L 2200/026;
(Continued)

(56) References Cited

U.S. PATENT DOCUMENTS 3,556,353 A  1/1971  Echols
3,668,102 A  6/1972  Young
(Continued)

FOREIGN PATENT DOCUMENTS

CN  201592099   9/2010
CN  201791102   4/2011
(Continued)

OTHER PUBLICATIONS

PCT International Search Report and Written Opinion dated Feb. 9, 2015 (11 Pages).
(Continued)

*Primary Examiner* — Dennis White
*Assistant Examiner* — Bryan Kilpatrick (57) ABSTRACT

An anti-evaporation tube for use with an in vitro diagnostics automation system is provided. The anti-evaporation tube includes an anti-evaporation tube body configured to be automatically inserted in a container and to limit evaporation of one or more fluids in the container and an alignment portion disposed on the anti-evaporation tube body. The alignment portion is configured to automatically align the anti-evaporation tube body within the container and cause the anti-evaporation tube body to remain aligned within the container. The alignment portion includes one or more openings disposed on an upper area of the anti-evaporation tube body. The one or more openings are configured to provide ventilation.

16 Claims, 8 Drawing Sheets

(51) Int. Cl.
*G01N 35/10* (2006.01)
*B01L 3/00* (2006.01)

(52) U.S. Cl.
CPC .......... *G01N 35/1016* (2013.01); *B01L 3/527* (2013.01); *B01L 2200/025* (2013.01); *B01L 2200/026* (2013.01); *B01L 2200/142* (2013.01); *B01L 2200/16* (2013.01); *B01L 2300/0832* (2013.01); *B01L 2300/0854* (2013.01); *B01L 2300/123* (2013.01); *G01N 35/1002* (2013.01); *G01N 2035/00673* (2013.01); *G01N 2035/0403* (2013.01)

(58) Field of Classification Search
CPC ..... B01L 2300/0832; B01L 2300/0854; G01N 2035/0405; G01N 35/1011; G01N 35/00663; G01N 2035/1025
See application file for complete search history.

(56) References Cited

U.S. PATENT DOCUMENTS

| | | | |
|---|---|---|---|
| 5,102,631 A * | 4/1992 | Jordan | B01L 3/508 206/814 |
| 5,230,539 A * | 7/1993 | Olson | F16L 37/0925 285/243 |
| 6,756,008 B2 | 6/2004 | Sudo | |
| 8,003,053 B2 | 8/2011 | Senftner et al. | |
| 8,153,086 B2 | 4/2012 | Senftner et al. | |
| 8,206,648 B2 | 6/2012 | Sattler | |
| 2003/0223914 A1 | 12/2003 | Arter et al. | |
| 2011/0293478 A1* | 12/2011 | Robert | B01L 3/5082 422/68.1 |
| 2014/0263163 A1* | 9/2014 | Knight | B01F 15/00837 215/386 |

FOREIGN PATENT DOCUMENTS

| | | |
|---|---|---|
| DE | 195 36 789 A1 | 4/1997 |
| EP | 2 969 168 A2 | 1/2016 |
| WO | 97/12677 A1 | 10/1997 |
| WO | 2014/153116 A2 | 9/2014 |

OTHER PUBLICATIONS

Extended EP Search Report dated Oct. 15, 2016 of corresponding European Application No. 14859731.3, 4 Pages.

* cited by examiner

REAGENT CONTAINER ANTI-EVAPORATION TUBE

CROSS-REFERENCE TO RELATED APPLICATIONS

This application claims priority to U.S. provisional application Ser. No. 61/900,220 filed Nov. 5, 2013, which is incorporated herein by reference in its entirety.

TECHNOLOGY FIELD

The embodiments disclosed herein relate in general to in vitro diagnostics automation systems and, more particularly, to anti-evaporation tubes for use with in vitro diagnostics automation systems.

BACKGROUND

In vitro diagnostics (IVD) assists in the diagnosis of disease based on assays performed on patient fluid samples. IVD includes various types of analytical tests and assays typically conducted with automated clinical chemistry analyzers (analyzers) onto which fluid containers, such as tubes or vials containing patient samples, have been loaded. The analyzer may then perform one or more various reagent methods by extracting a fluid sample from the vial and combines the sample with one or more reagent fluids (reagents) in special reaction cuvettes or tubes (referred to generally as reaction vessels).

After reagent fluid containers are opened, the reagents in the container may begin to evaporate, reducing the amount of reagent to be used and reducing the concentration. In some conventional systems, an anti-evaporation tube is inserted into the neck of the reagent container to minimize exposure of the liquid surface to the atmosphere, prevent the evaporation of the reagents during operation and provide adequate open-well stability in one or more fluids in the containers, such as liquid reagents. In these conventional systems, an operator manually opens the reagent container (e.g., removal of a cap closure) and manually inserts an anti-evaporation tube in the container.

SUMMARY

Embodiments provide an anti-evaporation tube for use with an in vitro diagnostics automation system. The anti-evaporation tube includes an anti-evaporation tube body configured to be automatically inserted in a container and to limit evaporation of one or more fluids in the container and an alignment portion disposed on the anti-evaporation tube body, the alignment portion configured to automatically align the anti-evaporation tube body within the container and cause the anti-evaporation tube body to remain aligned within the container. The alignment portion includes one or more openings disposed on an upper area of the anti-evaporation tube body, the one or more openings configured to provide ventilation.

According to one embodiment, the one or more openings are oblong shaped.

According to another embodiment, the alignment portion is configured such that when the anti-evaporation tube body is automatically inserted in the container, the one or more openings are positioned relative to a neck of the container such that a slot cross section is reduced by the neck of the container.

In one embodiment, the one or more openings are configured to limit one or more fluids in the container from flowing through the one or more openings and adhering to the surfaces of the anti-evaporation tube body.

Embodiments provide an anti-evaporation tube for use with an in vitro diagnostics automation system. The anti-evaporation tube includes an anti-evaporation tube body configured to be automatically inserted in a container and to limit evaporation of one or more fluids in the container and an alignment portion disposed on the anti-evaporation tube body and having a plurality of self-alignment components. The self-alignment components include a plurality of flexible portions extending vertically away from a top of the anti-evaporation tube body and a plurality of slots alternating between the plurality of flexible portions. The plurality of flexible portions are configured to move from an initial position to facilitate insertion of the alignment portion through an opening of the container and limit movement of the anti-evaporation tube body within the container.

According to one embodiment, the plurality of flexible portions are further configured to: (i) flex inward from the initial position to facilitate insertion of the alignment portion through the opening of the container; and (ii) deflex outward to contact an inner surface of the container and automatically align the anti-evaporation tube body at an initial anti-evaporation tube location and limit movement of the anti-evaporation tube body within the container.

According to another embodiment, the alignment portion includes four flexible portions and four slots alternating between the plurality of flexible portions, the four slots being equally spaced from each other.

In one embodiment, the plurality of flexible portions are further configured to provide a friction fit against an inner surface of the container to limit movement of the anti-evaporation tube body within the container.

In an aspect of an embodiment, the plurality of flexible portions are further configured to provide the friction fit against a container neck portion of the inner surface.

According to one embodiment, the plurality of self-alignment components are further configured to align the anti-evaporation tube body with a low portion of a bottom of the container configured to hold a remaining amount of fluid.

According to another embodiment, the plurality of self-alignment components are further configured to prevent the anti-evaporation tube body from moving greater than a threshold tube displacement distance from the alignment position within the container.

In yet another embodiment, the plurality of self-alignment components are further configured to automatically align the anti-evaporation tube body to prevent an aspiration component from contacting the anti-evaporation tube during operation.

In an aspect of an embodiment, the plurality of self-alignment components include at least one of: (i) one or more protrusions configured to be received by opposing recesses in the container; and (ii) one or more recesses configured to receive opposing protrusions in the container.

Embodiments provide a method of operating an in vitro diagnostics automation system. The method includes automatically inserting an anti-evaporation tube into a container during a fluid filling operation by flexing a plurality of flexible portions of the anti-evaporation tube, each adjacent pair of the flexible portions being separated by a slot. The method also includes aligning the anti-evaporation tube into a container by deflexing the plurality of flexible portions to contact an inner surface of the container.

According to one embodiment, the method further includes applying a friction to the inner surface of the container with the plurality of flexible portions.

Embodiments provide an in vitro diagnostics automation system that includes one or more containers each configured to hold one or more fluids. The automation system also includes one or more anti-evaporation tubes each comprising self-alignment components having a plurality of flexible portions separated by a plurality of slots. The self-alignment components are configured to: (i) self-align within the one or more containers; and (ii) limit movement of the one or more anti-evaporation tubes within the one or more containers. The automation system also includes a fluid filling assembly configured to automatically fill the one or more containers with the one or more fluids. The automation system further includes an anti-evaporation tube inserting component configured to automatically insert one of the one or more anti-evaporation tubes within one of the one or more containers.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following Figures.

DESCRIPTION OF EXEMPLARY EMBODIMENTS

Manual interaction (e.g., manually opening the reagent container and inserting an anti-evaporation tube) may increase system latency and decrease system throughput. Further, the manual operations to prepare the reagent containers for use may increase workflow, such as removing and discarding the closure, inserting an anti-evaporation tube and inserting the container onto an instrument.

Embodiments disclosed herein may include anti-evaporation tubes configured to be used in an automation system, such as, for example, an in vitro diagnostics automation system described in PCT Patent Application US13/24331, which is herein incorporated by reference.

Embodiments include an anti-evaporation tube configured to be automatically inserted into the container during the reagent filling operation and automatically align and remain aligned at a location within the container to provide reagent stability. Embodiments utilize automated insertion of anti-evaporation tubes during the reagent filling operation to reduce the reagent preparation labor and eliminate possible non-insertion of the tubes. In some embodiments, anti-evaporation tubes may be configured to be integral components of a reagent pack design that allows for fully automated reagent loading and unloading to an analyzer.

Figure 1:
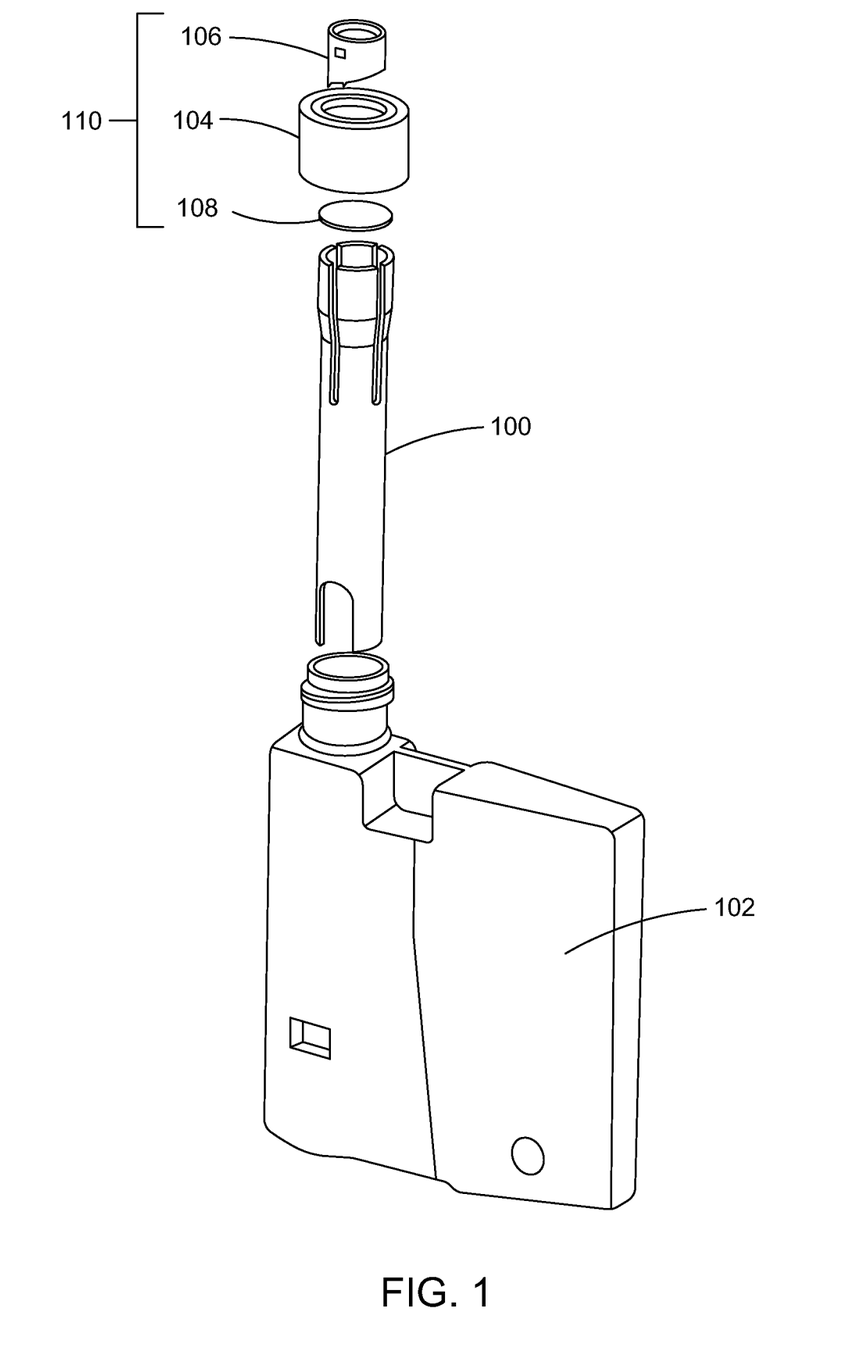
FIG. 1 is an exploded view of an exemplary wedge container having an exemplary anti-evaporation tube according to embodiments disclosed herein.

FIG. 1 is an exploded view of an exemplary wedge container 102 having an exemplary anti-evaporation tube 100 according to embodiments disclosed herein. As shown in the embodiment at FIG. 1, the wedge container 102 may also include a container closure 110, having a cap body 104, a cannula 106 and an induction seal portion 108 configured to seal off the one or more fluids in the container 102 from matter outside the container 102. The cannula 106 may be pushed down responsive to a force from a component (e.g., a pick and place device) and cause an opening in the sealing portion 108. The size and shape of the container 102 shown in FIG. 1 is merely exemplary. Further, the size, shape, and type of the closure 110 shown in FIG. 1 is also exemplary. Embodiments may include other containers having different sizes and shapes as well as different types of types of closures.

Figure 2A:
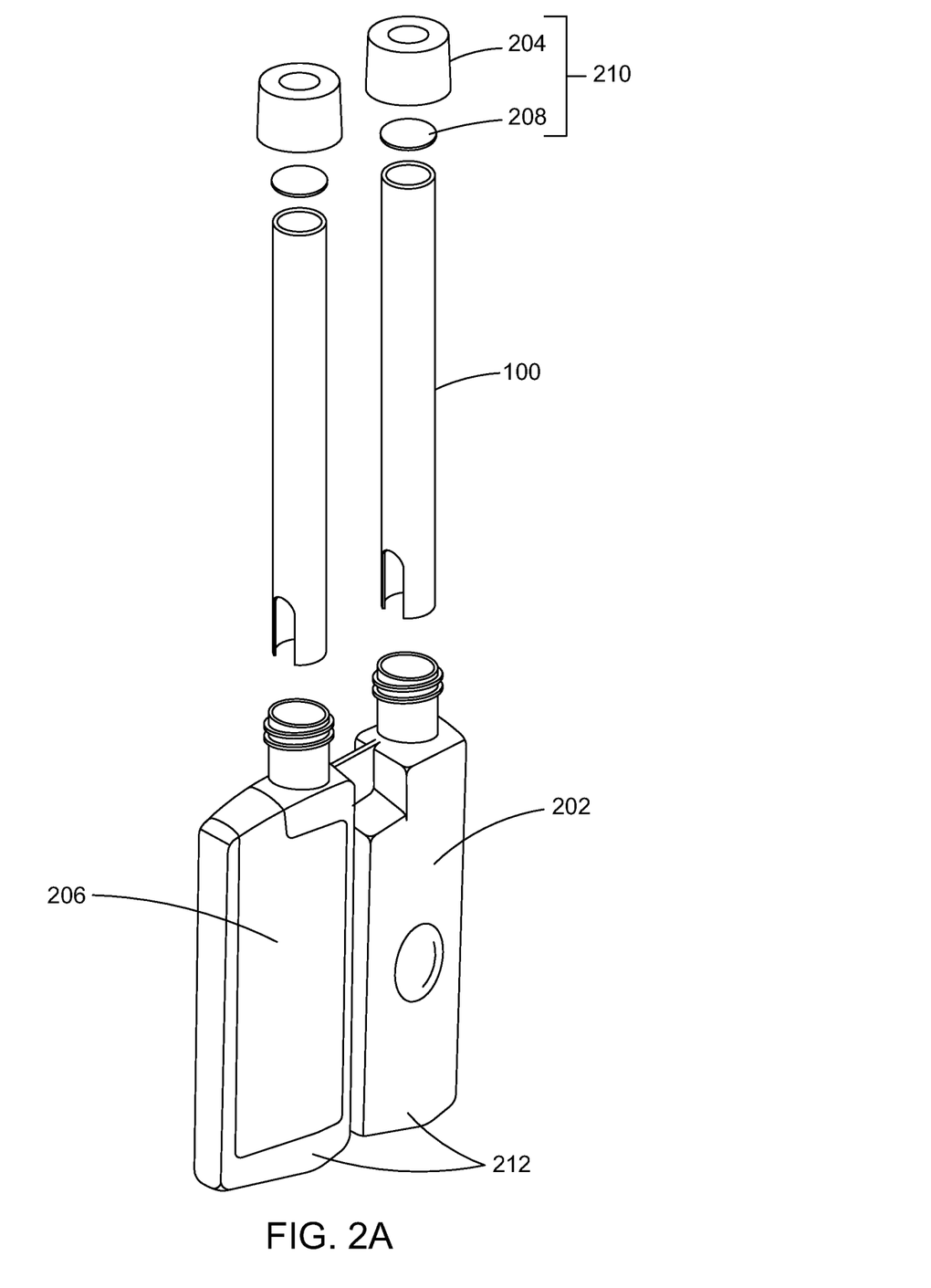
FIG. 2A is an exploded view of an exemplary multi-well wedge container with each well having an exemplary anti-evaporation tube according to embodiments disclosed herein.
Figure 2B:
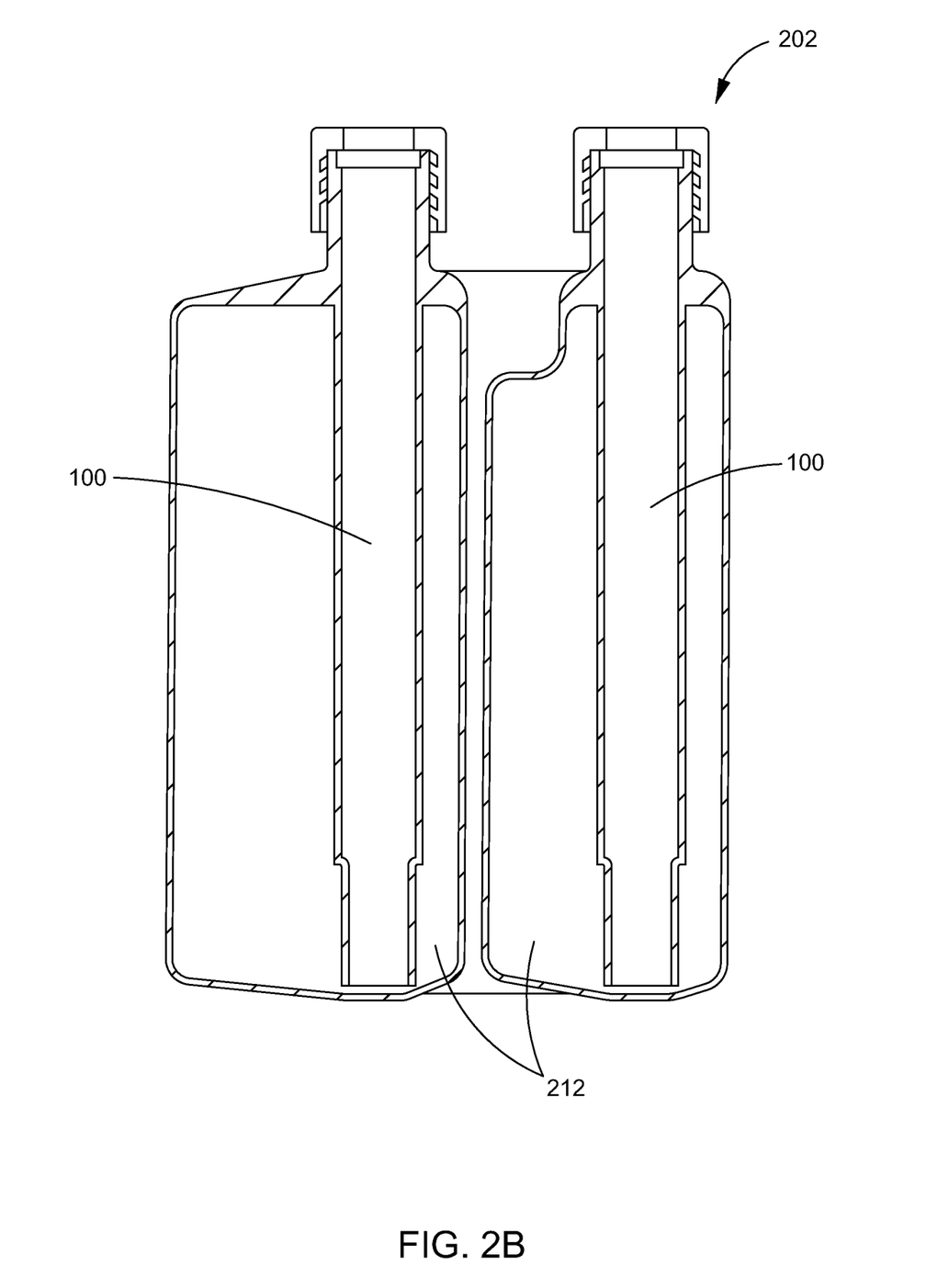
FIG. 2B is a partial cutaway side view of an exemplary multi-well wedge container with each well having an exemplary anti-evaporation tube according to embodiments disclosed herein.

FIG. 2A is an exploded view of an exemplary multi-well wedge container 202 having wells 212 with each well 212 having an exemplary anti-evaporation tube 100. FIG. 2B is a partial cutaway side view of the exemplary multi-well wedge container 202. The size, shape, and number of wells 212 shown in FIG. 2A and FIG. 2B is exemplary. As shown in FIG. 2A and FIG. 2B, the exemplary multi-well wedge container 202 may also include a container closure 210, having a cap 204 and an induction seal portion 208 configured to seal off the one or more fluids in the container 202 from matter outside the container 202. The container 202 may also include a label area 206.

During operation, a single well container (e.g., container 102) or a multi-well container (e.g., container 202) may be filled with one or more fluids (e.g., reagents) and the anti-evaporation tube 100 may be inserted automatically for the reagent method by a component (not shown) of the automation system. After the anti-evaporation tube 100 has been automatically inserted, the container closure (e.g., closure 110) may be placed on the container 102 until it is opened at a later time when the reagents are to be aspirated from the container 102 by, for example, a reagent probe.

Aspiration of fluids remaining at low portions in containers may be performed more efficiently if components that access the containers (e.g., reagent probe of an automation system) are accurately positioned at the low portions of the containers. If the anti-evaporation tubes are not accurately aligned within the containers, however, when reagent probes are positioned in the containers, the reagent probes may contact the anti-evaporation tubes and not be accurately positioned at the low portion.

Embodiments disclosed herein provide an anti-evaporation tube configured to be automatically inserted in a container and held in the container when the reagent is filled in the container. In some embodiments, the anti-evaporation tube may be configured to automatically align with and remain aligned with a low portion of a container bottom floor.

Figure 3:
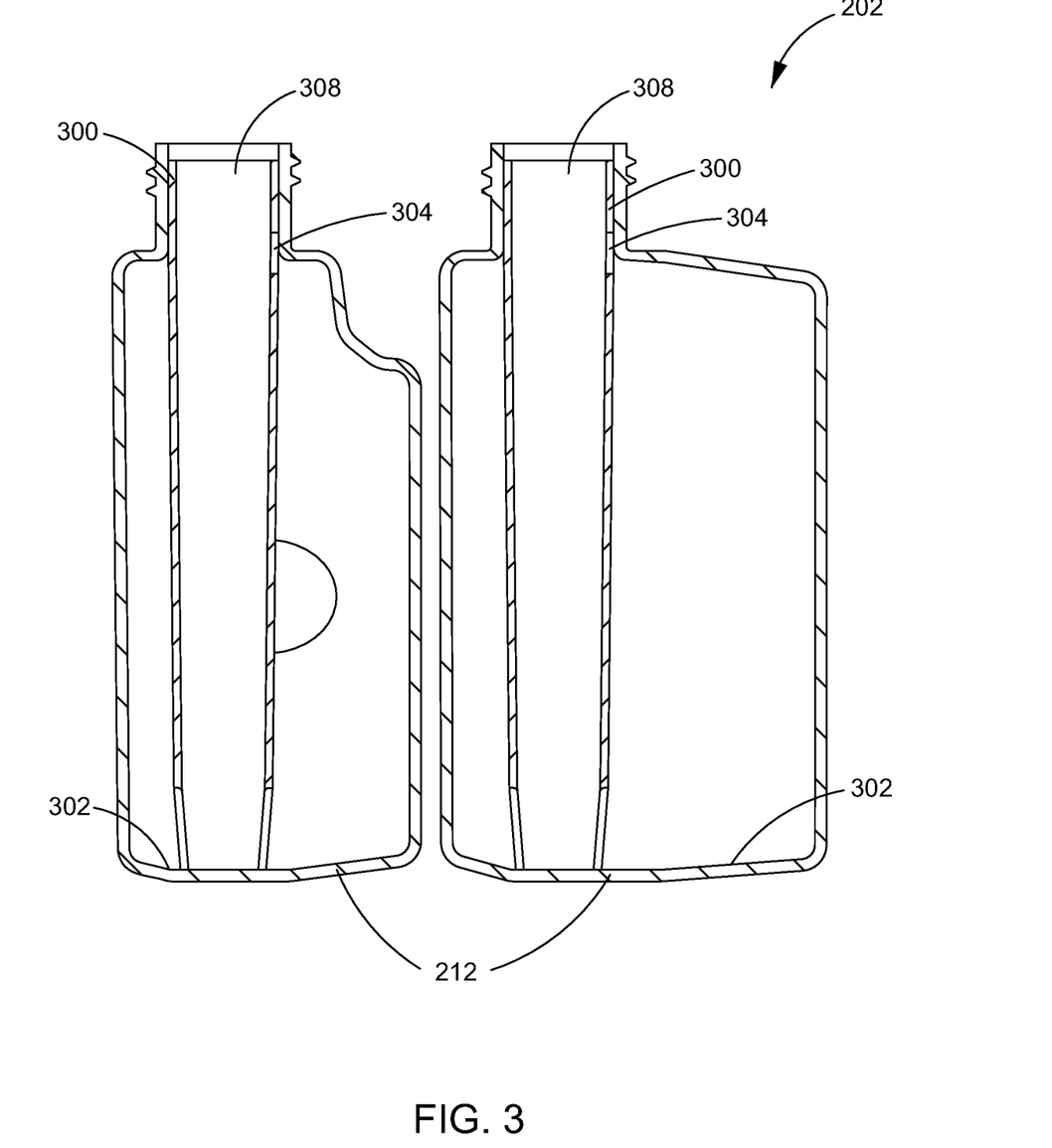
FIG. 3 shows cross sectional side views of each well of an exemplary multi-well wedge container with each well having an exemplary anti-evaporation tube according to embodiments disclosed herein.
Figure 4:
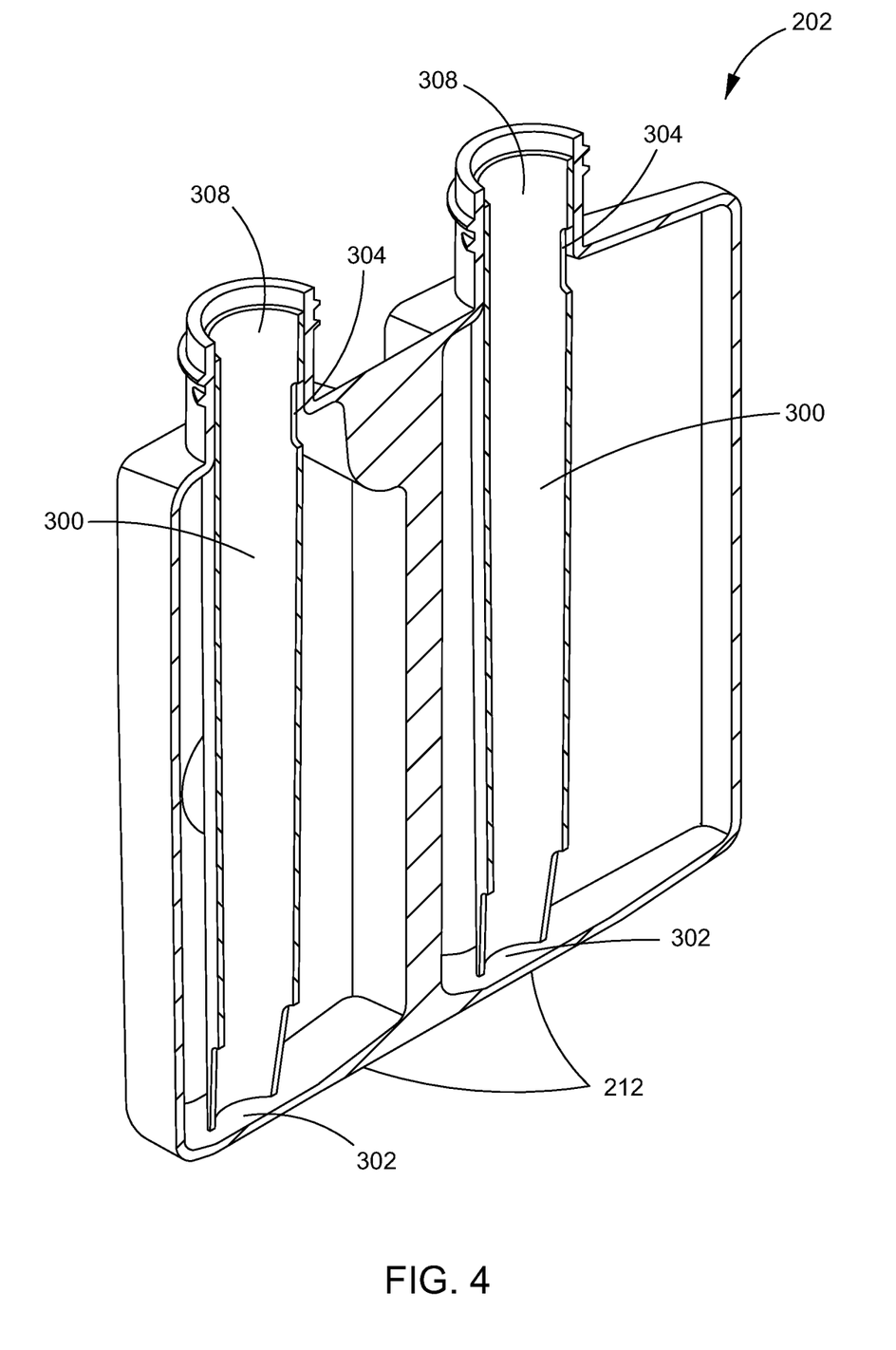
FIG. 4 is a perspective cross sectional view of the exemplary multi-well wedge container shown in FIG. 3.
Figure 5:
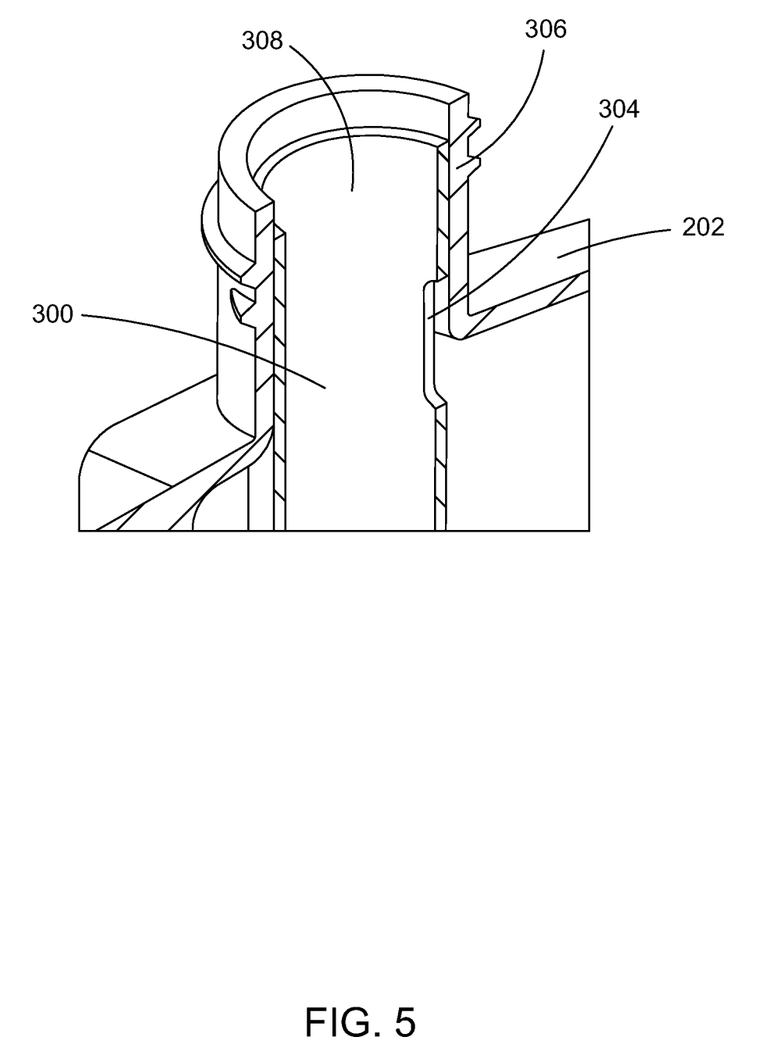
FIG. 5 is a close-up perspective cross sectional view of an upper area of an anti-evaporation tube disposed within a neck of the exemplary multi-well wedge container shown in FIG. 3.

For example, FIGS. 3-5 show an exemplary anti-evaporation tube 300 configured to automatically align with and remain aligned with a low portion of a bottom floor 302 of multi-well container 202 according to an embodiment. FIG. 3 shows cross sectional side views of each well 212 of an exemplary multi-well wedge container 202 with each well 212 having an exemplary anti-evaporation tube 300 according to an embodiment. FIG. 4 is a perspective cross sectional view of the exemplary multi-well wedge container 202 shown in FIG. 3. FIG. 5 is a close-up perspective cross sectional view of an upper area of an anti-evaporation tube 300 disposed within a neck 306 of the exemplary multi-well wedge container 202.

As shown in FIGS. 3-5, the anti-evaporation tubes 300 may each include an alignment portion 308 disposed on an upper area of the anti-evaporation tube 300. The alignment portion 308 is configured to automatically align the anti-evaporation tube body within the container 202 and cause the anti-evaporation tube 300 to remain aligned within the container 202. For example, as shown in FIG. 5, alignment portion 308 is positioned relative to a neck 306 and contacts neck 306 to remain aligned within container 202. In the embodiment, shown in FIG. 5, the alignment portion 308 is friction fit to neck 306. Embodiments may, however, include alignment portions configured to remain aligned within container 202 via other coupling techniques (e.g., snap fit and magnetization).

As shown in FIG. 3 to FIG. 5, the alignment portion 308 may include an opening, such as slot 304, disposed on an upper area of the anti-evaporation tube 300. The slot 304 may be used to provide ventilation, which aids in the prevention of evaporation. As shown in FIG. 5, the slot may be oblong shaped and is positioned such that the slot cross section is reduced by the neck 306 of the container 202 so that evaporation may be controlled. The location, size and shape of the slot 304 shown in FIG. 3 to FIG. 5 is exemplary. Embodiments may include slots having sizes and shapes different than the slot shown in FIG. 3 to FIG. 5. FIG. 3 to FIG. 5 also shows one slot 304. Embodiments may, however, include any number of slots. Factors for determining the shape, size and number of slots include, but are not limited to: (i) controlling evaporation; (ii) facilitating draining of adhered reagent; (iii) stability of the anti-evaporation tubes; and (iv) flexibility of the anti-evaporation tubes. For example, the location, shape and size of the slot 304 may be used to limit or prevent reagent from flowing into the slots 304 and adhering to the surfaces of the anti-evaporation tube 300 during shipping and handling of the container 202, thereby alleviating potential of aspiration errors due to the adhesive force not being overcome during aspiration.

Figure 6:
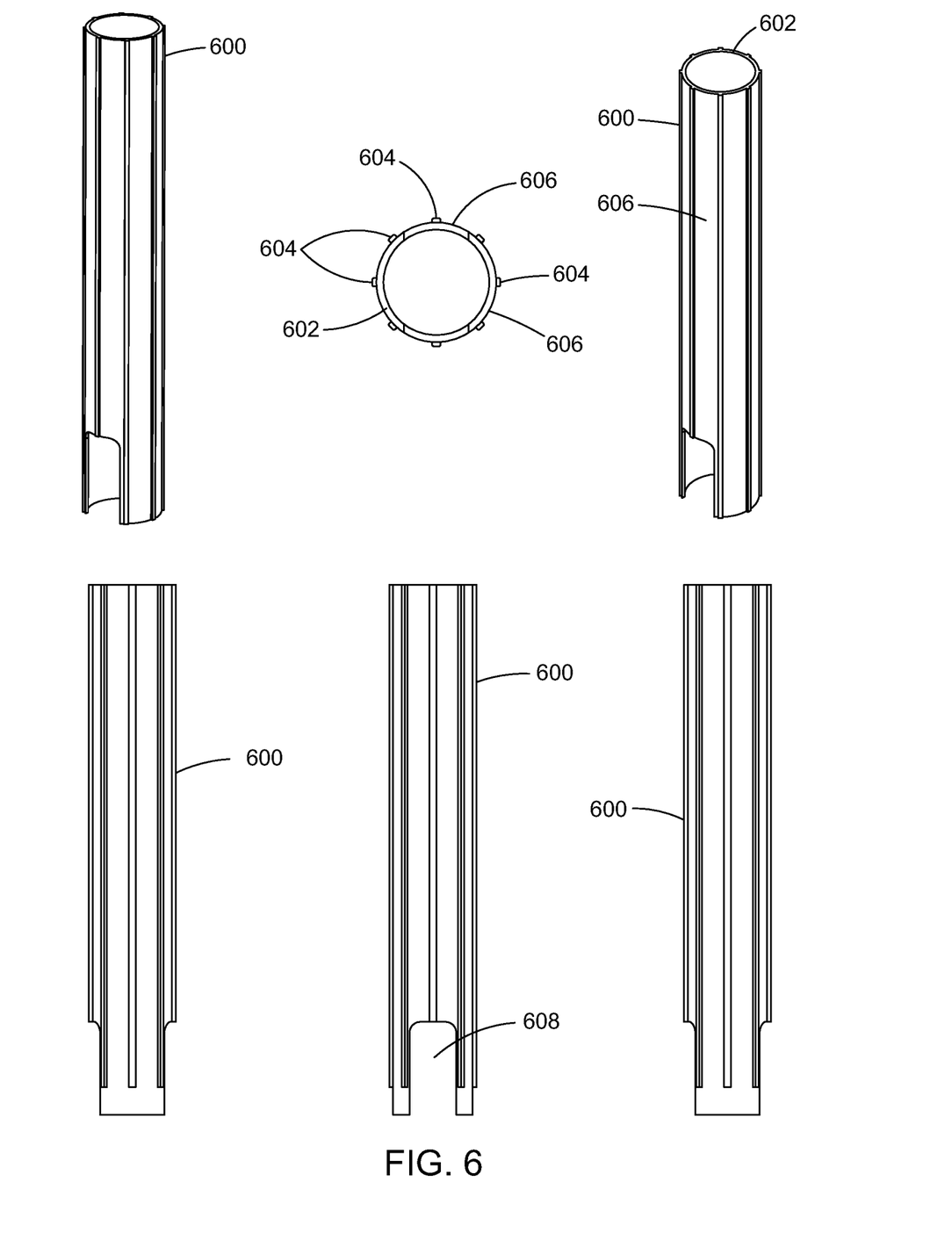
FIG. 6 illustrates different views of another exemplary anti-evaporation tube according to embodiments disclosed herein.

FIG. 6 illustrates different views of another exemplary anti-evaporation tube that may be configured to be inserted into a container, such as single well container 102 or double well container 202. In the embodiment shown at FIG. 6, the anti-evaporation tube 600 may include a plurality of protrusions 604 configured to engage the container 102 or 202 (e.g., recesses in container neck) when inserted in the container 102 and 202. In some aspects, the anti-evaporation tube may include recesses to engage protrusions in the container. The anti-evaporation tube 600 may also include a plurality of vents 606 disposed between the plurality of protrusions 604. The anti-evaporation tube 600 may also include a recessed area 608 for liquid fill disposed at a bottom portion of the anti-evaporation tube.

Embodiments provide anti-evaporation tubes configured to be automatically inserted in containers (e.g., container 102 and container 202) and held in the containers when the reagent is filled in the container. In some embodiments, the anti-evaporation tubes may be configured to automatically align with and remain aligned with a low portion of a container bottom floor. The anti-evaporation tubes may include movable features configured to flex and deflex (e.g., spring in and out) to facilitate insertion of the anti-evaporation tubes in the containers and align and prevent movement of the anti-evaporation tubes within the containers.

Figure 7:
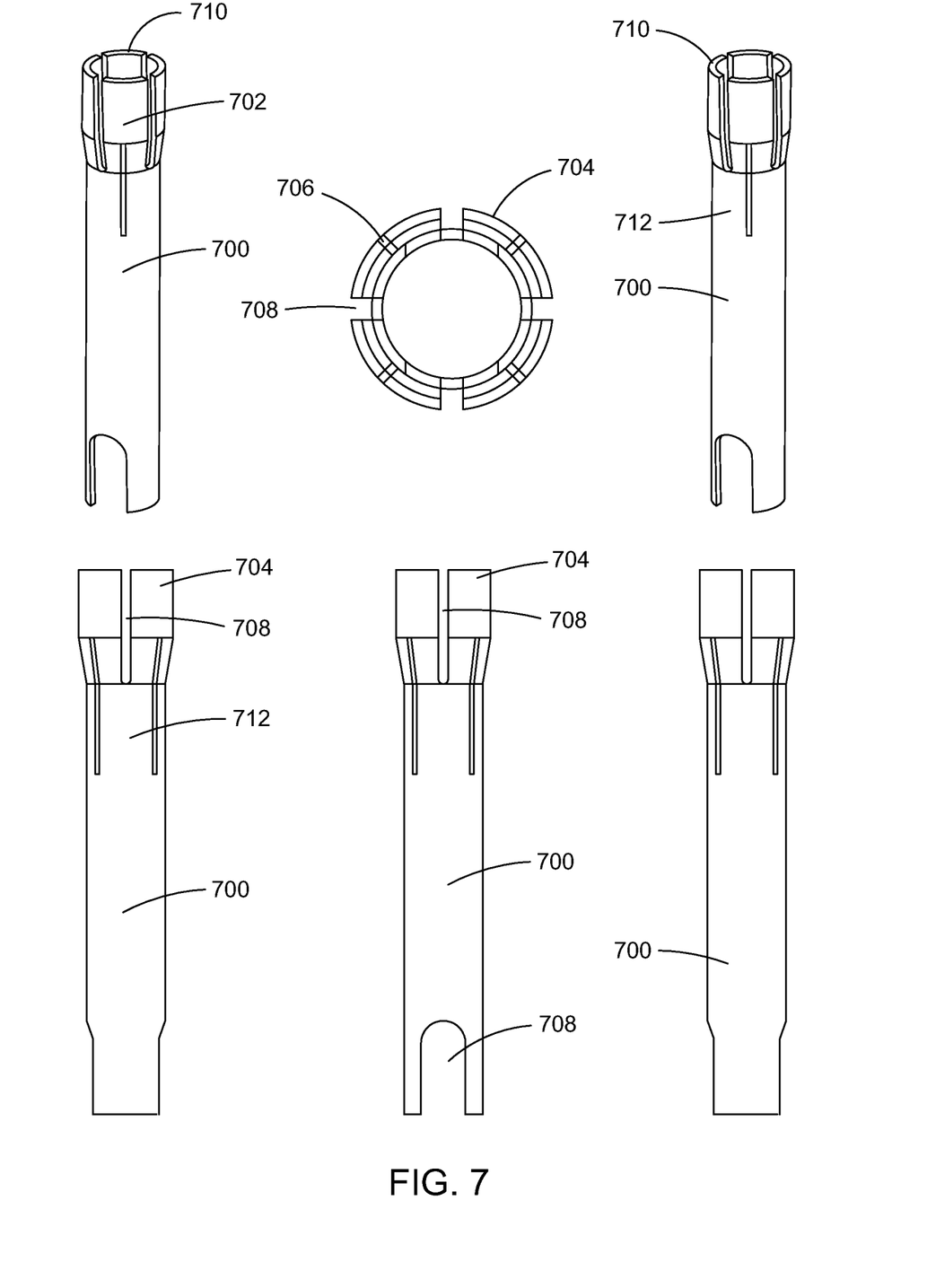
FIG. 7 illustrates different views of another exemplary anti-evaporation tube according to embodiments disclosed herein.

For example, FIG. 7 illustrates different views of another exemplary anti-evaporation tube 700 which includes alignment components 702 disposed at a top portion 710 of the anti-evaporation tube 700. The alignment components 702 may flex so that the anti-evaporation tube 700 may be inserted in the container (e.g., container 102 and container 202) and deflex to remain aligned within the container 102 or 202. The alignment components 702 may include a flexible portion 706 and an alignment portion 704.

As shown in the embodiment at FIG. 7, the anti-evaporation tube 700 may include slots 708 between the movable alignment components 702 of the anti-evaporation tube that allow for the flexing and deflexing to provide ventilation which aids in the prevention of evaporation. In some aspects, slots 708 may be configured to allow the anti-evaporation tube 700 to be inserted into a container 102 or 202 and be locked into position. The slots 708 may allow one or more flexible portions 706 proximate to the slots 708 to flex inward during insertion and deflex back after insertion such that the alignment portions 704 provide a friction fit against an inner surface of container neck to hold the anti-evaporation tube 700 into position.

In the embodiment shown at FIG. 7, the anti-evaporation tube 700 includes four slots equally spaced from each other and four movable alignment components 702 between each of the four slots 708. The movable alignment components 702 may extend vertically from a mid-portion 712 of the evaporation tube 700. As shown in FIG. 7, each movable alignment component 702 may extend equal lengths. Factors for determining the lengths of slots 708 may include lengths that provide the four movable alignment components 702 with sufficient flexibility to flex to facilitate insertion of the anti-evaporation tube 700 in the container and deflex to align and prevent movement of the anti-evaporation tube 700 within the container. Embodiments may include any number of slots having different geometries and at different locations on anti-evaporation tubes. The anti-evaporation tube 700 may also include a recessed area 708 for liquid fill disposed at a bottom portion of the anti-evaporation tube 700.

Embodiments are not limited to those disclosed. Those skilled in the art will appreciate that numerous changes and modifications may be made to the preferred embodiments disclosed herein and that such changes and modifications may be made without departing from the true spirit of the embodiments disclosed herein. It is therefore intended that the appended claims be construed to cover all such equivalent variations as fall within the true spirit and scope of the embodiments disclosed herein.

What is claimed is:

1. An anti-evaporation tube for use with an in vitro diagnostics automation system comprising:
   an anti-evaporation tube body configured to be automatically inserted in a container and to limit evaporation of one or more fluids in the container;
   an alignment portion disposed on the anti-evaporation tube body, the alignment portion comprising: a plurality of self-alignment components and a plurality of first elongate slots alternating between the plurality of self-alignment components wherein each first elongate slot has a top end and a bottom end; and
   a plurality of second elongate slots configured to provide ventilation, wherein each second elongate slot is disposed on the anti-evaporation tube body between two adjacent first elongate slots, wherein each second elongate slot has a top end and a bottom end, wherein the top end of each second elongate slot is located above the bottom end of each first elongate slot;
   each self-alignment component comprising:
      a self-alignment portion; and
      a flexible portion disposed on the self-alignment portion;
      wherein, the flexible portion is configured to move from an initial position to facilitate insertion of the alignment portion through an opening of the container and limit movement of the anti-evaporation tube body within the container.

2. The anti-evaporation tube of claim 1, wherein the plurality of flexible portions are further configured to: (i) flex inward from the initial position to facilitate insertion of the alignment portion through the opening of the container; and (ii) deflex outward to contact an inner surface of the container and automatically align the anti-evaporation tube body at an initial anti-evaporation tube location and limit movement of the anti-evaporation tube body within the container.

3. The anti-evaporation tube of claim 1, wherein the alignment portion comprises four flexible portions and four first elongate slots alternating between the plurality of flexible portions, the four first elongate slots being equally spaced from each other.

4. The anti-evaporation tube of claim 1, wherein the plurality of flexible portions are further configured to provide a friction fit against an inner surface of the container to limit movement of the anti-evaporation tube body within the container.

5. The anti-evaporation tube of claim 4, wherein the plurality of flexible portions are further configured to provide the friction fit against a container neck portion of the inner surface.

6. The anti-evaporation tube of claim 1, wherein the plurality of self-alignment components are further configured to align the anti-evaporation tube body with a portion of a bottom of the container configured to hold a remaining amount of fluid.

7. The anti-evaporation tube of claim 1, wherein the plurality of self-alignment components are further configured to prevent the anti-evaporation tube body from moving greater than a threshold tube displacement distance from the alignment position within the container.

8. The anti-evaporation tube of claim 1, wherein the plurality of self-alignment components are further configured to automatically align the anti-evaporation tube body to prevent an aspiration component from contacting the anti-evaporation tube during operation.

9. The anti-evaporation tube of claim 8, wherein the anti-evaporation tube body further comprises at least one of: (i) one or more protrusions configured to be received by opposing recesses in the container; and (ii) one or more recesses configured to receive opposing protrusions in the container.

10. A method of operating an in vitro diagnostics automation system, the method comprising:
    automatically inserting an anti-evaporation tube into a container during a fluid filling operation by flexing an alignment portion of the anti-evaporation tube, the alignment portion includes a plurality of self-alignment components and a plurality of first elongate slots alternating between the plurality of self-alignment components, wherein each first elongate slot has a top end and a bottom end, wherein each self-alignment component incudes a self-alignment portion and a flexible portion disposed on the self-alignment portion, wherein the anti-evaporation tube further includes a plurality of second elongate slots configured to provide ventilation, wherein each second elongate slot is disposed on the anti-evaporation tube body and between two adjacent first elongate slots; wherein each second elongate slot has a top end and a bottom end, wherein the top end of each second elongate slot is located above the bottom end of each first elongate slot; and
    aligning the anti-evaporation tube into a container by deflexing the flexible portion to contact an inner surface of the container.

11. The method of claim 10, further comprising:
    applying a friction to the inner surface of the container with the plurality of flexible portions.

12. An in vitro diagnostics automation system comprising:
    one or more containers each configured to hold one or more fluids;
    one or more anti-evaporation tubes each comprising an anti-evaporation tube body, a plurality of self-alignment components separated by a plurality of first elongate slots, and a plurality of second elongate slots configured to provide ventilation, wherein each first elongate slot has a top end and a bottom end, wherein each second elongate slot is disposed on the anti-evaporation tube body and between two adjacent first elongate slots, wherein each second elongate slot has a top end and a bottom end, wherein the top end of each second elongate slot is located above the bottom end of each first elongate slot, wherein each self-alignment component includes a self-alignment portion and a flexible portion disposed on the self-alignment portion, the plurality of self-alignment components configured to: (i) self-align within the one or more containers; and (ii) limit movement of the one or more anti-evaporation tubes within the one or more containers;
    a fluid filling assembly configured to automatically fill the one or more containers with the one or more fluids; and
    an anti-evaporation tube inserting component configured to automatically insert one of the one or more anti-evaporation tubes within one of the one or more containers.

13. The anti-evaporation tube of claim 1, wherein the self-alignment portion extends vertically away from a bottom of the anti-evaporation tube body.

14. The method of claim 10, wherein the self-alignment portion extends vertically away from a bottom of the anti-evaporation tube body.

15. The in vitro diagnostics automation system of claim 12, wherein the self-alignment portion extends vertically away from a bottom of the anti-evaporation tube body.

16. The anti-evaporation tube of claim 8, wherein the anti-evaporation tube body further comprises one or more protrusions configured to be received by opposing recesses in the container, wherein each protrusion extends along an entire length of the anti-evaporation tube body.

* * * * *